(12) United States Patent
Sivakumar et al.

(10) Patent No.: US 11,728,955 B2
(45) Date of Patent: Aug. 15, 2023

(54) DYNAMIC TELECOM NETWORK AGENT FILTERING

(71) Applicant: INTERNATIONAL BUSINESS MACHINES CORPORATION, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 17/453,051

(22) Filed: Nov. 1, 2021

(65) Prior Publication Data

US 2023/0136692 A1    May 4, 2023

(51) Int. Cl.
    *H04L 5/00*      (2006.01)
    *H04W 64/00*   (2009.01)
    *H04W 72/541* (2023.01)

(52) U.S. Cl.
    CPC .......... *H04L 5/0073* (2013.01); *H04L 5/0069* (2013.01); *H04W 64/006* (2013.01); *H04W 72/541* (2023.01)

(58) Field of Classification Search
    None
    See application file for complete search history.

(56) References Cited

U.S. PATENT DOCUMENTS

| | | | |
|---|---|---|---|
| 6,469,992 | B1 | 10/2002 | Schieder |
| 10,349,418 | B2 | 7/2019 | Gerszberg |
| 11,178,041 | B1 * | 11/2021 | Sivakumar ............ H04L 41/122 |

(Continued)

FOREIGN PATENT DOCUMENTS

WO    WO2016126347 A1    8/2016

OTHER PUBLICATIONS

Adaptive and efficient data compression technologies in 5G digital mobile fronthaul networks; https://www.spiedigitallibrary.org/conference-proceedings-of-spie/11307/1130707/Adaptive-and-efficient-data-compression-technologies-in-5G-digital-mobile/10.1117/12.2546740.short?SSO=1; retrieved from the Internet Jul. 19, 2021; 1 page.

(Continued)

*Primary Examiner* — Diane L Lo
(74) *Attorney, Agent, or Firm* — Schmeiser, Olsen & Watts, LLP; Edward Wixted

(57) ABSTRACT

A system, method, and computer program product for implementing dynamic telecom network agent filtering is provided. The method includes retrieving peripheral data associated with user equipment (UE) enabled with respect to a telecom network associated with a telecom network hardware device. The peripheral data is mapped with a predefined filter selection model and a filtering agent model is selected. Likewise, filtering agents associated with the UE are selected and environmental characteristics associated with the telecom network are retrieved. A location of the UE is tagged and the filtering agents are pushed to the UE. Network commands associated with execution of the filtering agents are generated and the filtering agents are executed with respect to the UE. In response, noise and distortion occurring during operation of the UE with respect to the telecom network is reduced.

20 Claims, 10 Drawing Sheets

(56) References Cited

U.S. PATENT DOCUMENTS

| | | | | |
|---|---|---|---|---|
| 2014/0331221 | A1* | 11/2014 | Dong | H04L 45/00 718/1 |
| 2019/0052549 | A1 | 2/2019 | Duggal et al. | |
| 2019/0149434 | A1 | 5/2019 | Chou et al. | |
| 2021/0029042 | A1* | 1/2021 | Maria | H04L 47/20 |

OTHER PUBLICATIONS

Aijaz, Adnan; Packet Duplication in Dual Connectivity Enabled 5G Wireless Networks: Overview and Challenges; arXiv: 1804.01058v2 [cs.NI]; May 29, 2019; 9pages.

Carstens, Juergen; Power Consumption Optimization and a Framework for Adaptive Symbol Rate Transmission with Two Layers Feedback Scheme Incorporated into the Network Management; IP.com; IPCOM000173713D; Sep. 11, 2008; 6 pages.

Chen, Lei et al; Interference cancelation scheme with variable bandwidth allocation for universal filtered multicarrier systems in 5G networks; EURASIP Journal on Wireless Communications and Networking; 2018; 11 pages.

Collela, Paolo; 5G and IoT: Ushering in a new era; https://www.ericsson.com/en/about-us/company-facts/ericsson-worldwide/india/authored-articles/5g-and-iot-ushering-in-a-new-era; retrieved from the Internet Jul. 25, 2021; 3 pages.

Fernandez, Oscar et al.; Compact Low-Cost Filter for 5G Interference Reduction in UHF Broadcasting Band; Electronics 2021; Apr. 19, 2021; 14 pages.

GSMA; AI in Network Use Cases in China; https://www.gsma.com/futurenetworks/wp-content/uploads/2019/10/AI-in-Networks-Use-Case-V.03-231019-Document.pdfOct. 2019; 93 pages.

Hong, Steven et al.; Applications of Self-Interference Cancellation in 5G and Beyond; IEEE Communications Magazine; Feb. 2014; 8 pages.

Jung, Kyunghun; Optimizing media and radio signal processing for 5G; https://www.3gpp.org/news-events/1950-sa4; Mar. 20, 2018; 2 pages.

LTE eNB Architecture; https://www.artizanetworks.com/resources/tutorials/arc.html; retrieved from the Internet Jul. 25, 2021; 5 pages.

MediaTek; Uplink Data Compression—3GPP Solutions for Enhancing the Uplink Performance White-Paper; https://d86o2zu8ugzlg.cloudfront.net/mediatek-craft/documents/MediaTek-UDC-White-Paper-PDFUDCWP-0718.pdf; retrieved from the Internet Jul. 26, 2021; 21 pages.

Mell, Peter et al.; "The NIST Definition of Cloud Computing;" National Institute of Standards and Technology; Special Publication 800-145; Sep. 2011; 7 pages.

Optimizing Network Applications for 5G; https://www.ericsson.com/en/news/2017/4/optimizing-network-applications-for-5g; Apr. 21, 2017; 3 pages.

ISR date of mailing Jan. 12, 2023, International application No. PCT/CN2022/128279, International filing date Oct. 28, 2022, 9 pages.

* cited by examiner

DYNAMIC TELECOM NETWORK AGENT FILTERING

BACKGROUND

The present invention relates generally to a method for filtering noise and distortion occurring within a telecom network an and in particular to a method and associated system for improving telecom network technology associated with selecting a filtering agent model and filtering agents, tagging a location of user equipment, activating the filtering agents, and reducing noise and distortion occurring during operation of the user equipment with respect to a telecom network.

SUMMARY

A first aspect of the invention provides a telecom network hardware device comprising a processor coupled to a computer-readable memory unit, the memory unit comprising instructions that when executed by the processor implements a dynamic telecom network agent filtering method comprising: retrieving, by the processor executing software code with respect to a virtual network function (VNF) and a physical network function (PNF) of the telecom network hardware device, peripheral data associated with user equipment (UE) enabled with respect to a telecom network associated with the telecom network hardware device; mapping, by the processor, the peripheral data with a pre-defined filter selection model; selecting from a pool of model resources, by the processor executing the pre-defined filter selection model and in response to results of the mapping, a filtering agent model; selecting, by the processor in response to executing the filtering agent model, filtering agents from the VNF and associated with noise and distortion reduction associated with the UE with respect to the telecom network; retrieving, by the processor via a plurality of global positioning system (GPS) sensors, environmental characteristics associated with the telecom network; tagging, by the processor based on the environmental characteristics, a specified location of the UE enabled with respect to the telecom network; pushing, by the processor, the filtering agents to the UE, wherein the filtering agents are stored within a temporary memory space of an operating system of the UE; generating, by the processor, network commands associated with execution of the filtering agents; executing, by the processor in response to enabling the network commands, the filtering agents with respect to the UE, wherein the executing activates the filtering agents with respect to the UE for a specified timeframe; and reducing, by the processor in response to results of the executing, noise and distortion occurring during operation of the UE with respect to the telecom network.

A second aspect of the invention provides a dynamic telecom network agent filtering method comprising: retrieving, by a processor of a telecom network hardware device executing software code with respect to a virtual network function (VNF) and a physical network function (PNF) of the telecom network hardware device, peripheral data associated with user equipment (UE) enabled with respect to a telecom network associated with the telecom network hardware device; mapping, by the processor, the peripheral data with a pre-defined filter selection model; selecting from a pool of model resources, by the processor executing the pre-defined filter selection model and in response to results of the mapping, a filtering agent model; selecting, by the processor in response to executing the filtering agent model, filtering agents from the VNF and associated with noise and distortion reduction associated with the UE with respect to the telecom network; retrieving, by the processor via a plurality of global positioning system (GPS) sensors, environmental characteristics associated with the telecom network; tagging, by the processor based on the environmental characteristics, a specified location of the UE enabled with respect to the telecom network; pushing, by the processor, the filtering agents to the UE, wherein the filtering agents are stored within a temporary memory space of an operating system of the UE; generating, by the processor, network commands associated with execution of the filtering agents; executing, by the processor in response to enabling the network commands, the filtering agents with respect to the UE, wherein the executing activates the filtering agents with respect to the UE for a specified timeframe; and reducing, by the processor in response to results of the executing, noise and distortion occurring during operation of the UE with respect to the telecom network.

A third aspect of the invention provides a computer program product, comprising a computer readable hardware storage device storing a computer readable program code, the computer readable program code comprising an algorithm that when executed by a processor of a telecom network hardware device implements a dynamic telecom network agent filtering method, the method comprising: retrieving, by the processor executing software code with respect to a virtual network function (VNF) and a physical network function (PNF) of the telecom network hardware device, peripheral data associated with user equipment (UE) enabled with respect to a telecom network associated with the telecom network hardware device; mapping, by the processor, the peripheral data with a pre-defined filter selection model; selecting from a pool of model resources, by the processor executing the pre-defined filter selection model and in response to results of the mapping, a filtering agent model; selecting, by the processor in response to executing the filtering agent model, filtering agents from the VNF and associated with noise and distortion reduction associated with the UE with respect to the telecom network; retrieving, by the processor via a plurality of global positioning system (GPS) sensors, environmental characteristics associated with the telecom network; tagging, by the processor based on the environmental characteristics, a specified location of the UE enabled with respect to the telecom network; pushing, by the processor, the filtering agents to the UE, wherein the filtering agents are stored within a temporary memory space of an operating system of the UE; generating, by the processor, network commands associated with execution of the filtering agents; executing, by the processor in response to enabling the network commands, the filtering agents with respect to the UE, wherein the executing activates the filtering agents with respect to the UE for a specified timeframe; and reducing, by the processor in response to results of the executing, noise and distortion occurring during operation of the UE with respect to the telecom network.

The present invention advantageously provides a simple method and associated system capable of filtering noise and distortion occurring within a telecom network.

DETAILED DESCRIPTION

Figure 1:
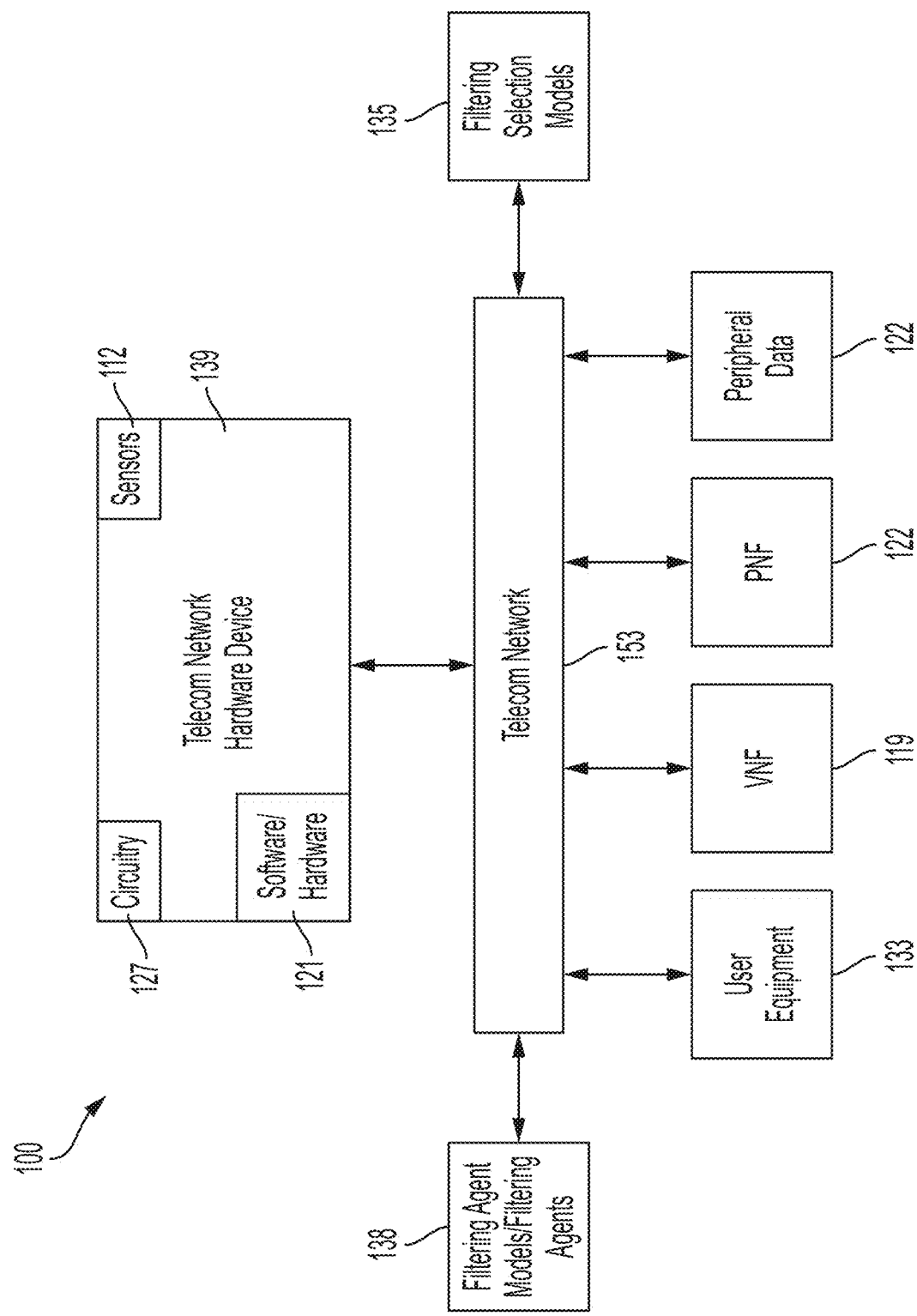
FIG. 1 illustrates a system for implementing an automated process for improving telecom network technology associated with selecting a filtering agent model and filtering agents, tagging a location of user equipment, activating the filtering agents, and reducing noise and distortion occurring during operation of the user equipment with respect to a telecom network, in accordance with embodiments of the present invention.

System FIG. 1 illustrates a system 100 for improving telecom network technology associated with selecting a filtering agent model and filtering agents 138, tagging a location of user equipment 133, activating the filtering agents 138, and reducing noise and distortion occurring during operation of the user equipment 133 with respect to a telecom network 153, in accordance with embodiments of the present invention. Typical fifth generation (5G) networks are configured to enable logical channeling processes that include dividing a frequency spectrum into categories for associated applications. Likewise, each category is further sub-divided into a number of logical channels based on a dynamic runtime configuration over a radio interface. The aforementioned internal segmentation process may cause a radio interface to associate with multiple sub-divided independent entities carrying packet data traffic from user equipment (UE) to an eNodeB (e.g., an element of an LTE radio access network) over a new radio interface that is multiplexed before transmission to a S1 bearer (e.g., a connectivity provider). Logical channeling processes may allow for distortion and interference (e.g., noise) to be added to a 5G network. Additionally (due to small cell architecture), if it has been determined that a user has crossed distance limits of a certain class of connectivity, then distortion within network traffic may increase which may lead to an increased packet retransmission requirement. The aforementioned increased distortion may not be directly removed because of associated base carrier requirements. An additional cause for distortion (within the 5G network) may include natural events such as, inter alia, like rain, fog, or $Co2$ presence within the air. Distortion may be injected into a 5G network within differing channels associated with 5G radio operations. Alternatively, distortion may be introduced within a UE device if a user is located at a noisy location. Likewise, background noise may be introduced into a 5G network thereby requiring additional processing at an eNodeB. Subsequently, interference data is formulated into packets and shared over a new radio (NR) interface thereby increasing network traffic. Typical noise filtering techniques are unable to enable a uniform process for preventing differing types of noise coming from UE entities and therefore the filtering processes must be transferred to an eNodeB such that eNodeB filters are used to reduce network traffic requirements.

The aforementioned filtering issues may not be rectified via simple data filtering techniques as requirements for filtering may differ for each type of interference and distortion introduced into a 5G network. Likewise, an amount of filtering techniques may be limited at an eNodeB and a UE device as they may only enable light weight processing capabilities with respect to a 5G core and an edge cloud processors. Additionally, a large portion of noise and distortion processing at transport endpoints may not be able to handle differing types of errors being added over various layers on NR and UE terminals. Therefore, system 100 is enabled to execute a process within a 5G telecom network virtual network function (VNF), collaborating with an individual physical network function to retrieve required information to build a multidimensional training model for filtering agents.

System 100 of FIG. 1 includes a telecom network hardware device 139, user equipment (UE) 133, a VNF 119, a PNF 122, peripheral data 122, filtering selection models 135, and filtering agent models/filtering agents 138 interconnected through a telecommunication (telecom) network 153. Telecom network hardware device 139 comprises sensors 112, circuitry 127, and software/hardware 121. UE 133 may comprise any type of communication device including, inter alia, a mobile device, a tablet computer, a laptop computer, a smart device, etc. Peripheral data may include any type of data associated with UE 133. Telecom network hardware device 139 and UE 133 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, telecom network hardware device 139 and UE 133 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving telecom network technology associated with selecting a filtering agent model and filtering agents, tagging a location of user equipment, activating the filtering agents, and reducing noise and distortion occurring during operation of the user equipment with respect to a telecom network. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Telecom network 117 may include any type of communication network including, inter alia, a cellular/mobile network, a local area network, (LAN), a wide area network (WAN), the Internet, a wireless network, etc.

System 100 is configured to collect weather related information and location-based data for building a location profile for specified objects served within respective PNF 122. Likewise, system 100 is configured to supply information to VNF 119. Additionally, system 100 is configured to collect all location-based requirements for noise and distortion filtering. The location-based requirements are used for building filtering selection model 135 implemented as a training corpus.

System 100 enables dynamic content insight delivery platforms to engage each other for retrieving real time location specific information from PNF 122. The real time location specific information may include, inter alia, weather related data and real time monitoring environmental data including, inter alia, a presence of fog, $CO_2$ in the air, etc. Accordingly, filtering agent requirements are updated to VNF 119. Proactive data retrieved from Internet situated resources are applied to retrieve PNF serving data such as rain related information, workload and channeling balancing information from a respective eNodeB within PNF 122, etc.

Upon reception of the aforementioned information and data, filtering selection models 135 are invoked with attributes received from various resources. Filtering selection models 135 are enabled via functions of VNF 119. Enabled filtering selection models 135 are configured to identify a requirement for a filtering algorithm and respective agents based on a situational (noise reduction) need.

If heavy rain is detected within a PNF serving region, distortion filters are selected with defined input parameters. A selected filter may be subsequently pushed to an edged entity based on a nature of an event. If distortion filters are selected, then the distortion filters may be pushed at eNodeB and related execution instructions may be transmitted to eNodeB over an S1 bearer.

Likewise, if noise or voice interference filters are required then they are pushed to eNodeB and executed over common control channel (CCCH) instructions utilizing S1 bearers and radio bearers to activate a signal. A related polling agent is configured to continuously validate a requirement validity and dissolve a filter with a feedback loop when a requirement is terminated. The feedback loop may be imposed with respect to a multidimensional model to improve related outcomes.

Figure 2:
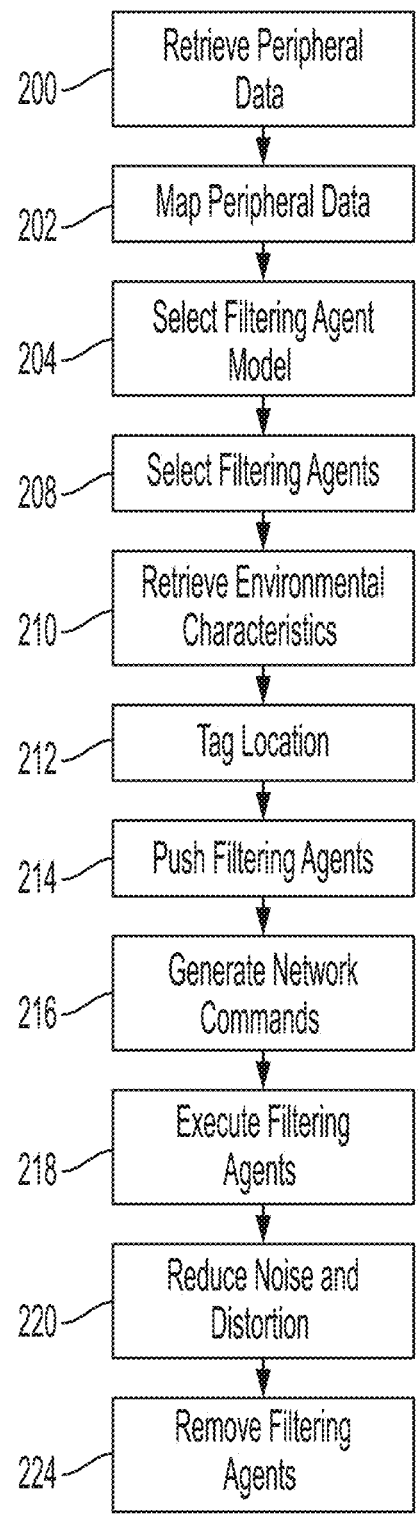
FIG. 2 illustrates an algorithm detailing a process flow enabled by the system of FIG. 1 for implementing an automated process for improving telecom network technology associated with selecting a filtering agent model and filtering agents, tagging a location of user equipment, activating the filtering agents, and reducing noise and distortion occurring during operation of the user equipment with respect to a telecom network, in accordance with embodiments of the present invention.

FIG. 2 illustrates an algorithm detailing a process flow enabled by system 100 of FIG. 1 for implementing an automated process for improving telecom network technology associated with selecting a filtering agent model and filtering agents, tagging a location of user equipment, activating the filtering agents, and reducing noise and distortion occurring during operation of the user equipment with respect to a telecom network, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by telecom network hardware device 139 and UE 133 133 of FIG. 1. In step 200, peripheral data is retrieved by a telecom network hardware device executing software code with respect to a VNF and a PNF of the telecom network hardware device. The peripheral data is associated with UE enabled with respect to a telecom network associated with the telecom network hardware device. In step 202, the peripheral data is mapped with a pre-defined filter selection model. In step 204, a filtering agent model is selected from a pool of model resources via execution of the pre-defined filter selection model and in response to results of the mapping of step 202. Selecting the filtering agent model may be executed with respect to a VNF and service orchestration layer of a 5G network.

In step 208, filtering agents are selected (via execution of the filtering agent model) from the VNF. The filtering agents are associated with noise and distortion reduction associated with the UE with respect to the telecom network. Selecting the filtering agents may include executing a VNF multidimensional machine learning model based on multilevel features and attributes of devices.

In step 210, environmental characteristics associated with the telecom network are retrieved via a plurality of global positioning system (GPS) sensors. The environmental characteristics may be associated with resources related to triggered PNF functions.

In step 212, a specified location of the UE enabled with respect to the telecom network is tagged based on the environmental characteristics. In step 214, the filtering agents are pushed to the UE. The filtering agents are stored within a temporary memory space of an operating system of the UE. Pushing the filtering agents to the UE may include:
1. Transmitting activation interaction code to the UE.
2. Activating (in response to execution of the activation interaction code) the filtering agents for executing noise and distortion reduction.

In step 216, network commands associated with execution of the filtering agents are generated. In step 218 (in response to enabling the network commands), the filtering agents are executed with respect to the UE thereby activating the filtering agents with respect to the UE for a specified timeframe. In step 220, noise and distortion occurring during operation of the UE with respect to the telecom network is reduced in response to execution of step 218. Reducing the noise and distortion may include:
1. Assessing requirements of the filtering agents with respect to a predefined polling frequency associated with a service running within the VNF.
2. Provisioning a respective filtering agent (of the filtering agents) to a malfunctioning device of the UE for executing the noise and distortion reduction.

In step 224 (after completing execution of step 220), the filtering agents are removed from UE.

Figure 3:
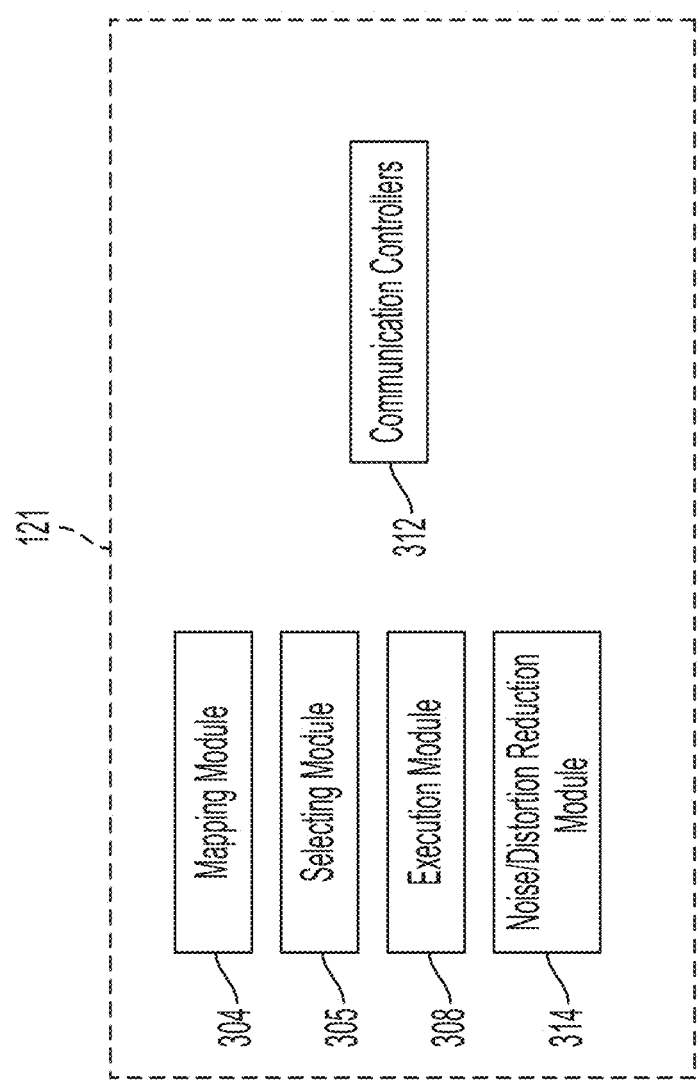
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes a mapping module 304, a selection module 305, an execution module 308, a noise and distortion reduction module 314, and communication controllers 312. Mapping module 304 comprises specialized hardware and software for controlling all functions related to the mapping steps of FIG. 2. Selecting module 305 comprises specialized hardware and software for controlling all functionality related to the filter selection steps described with respect to the algorithm of FIG. 2. Execution module 308 comprises specialized hardware and software for controlling all functions related to the filter agent execution steps of FIG. 2. Noise and distortion reduction module 314 comprises specialized hardware and software for controlling all functions related to the noise and distortion reduction steps of the algorithm of FIG. 2. Communication controllers 312 are enabled for controlling all communications between mapping module 304, selection module 305, execution module 308, and noise and distortion reduction module 314.

Figure 4:
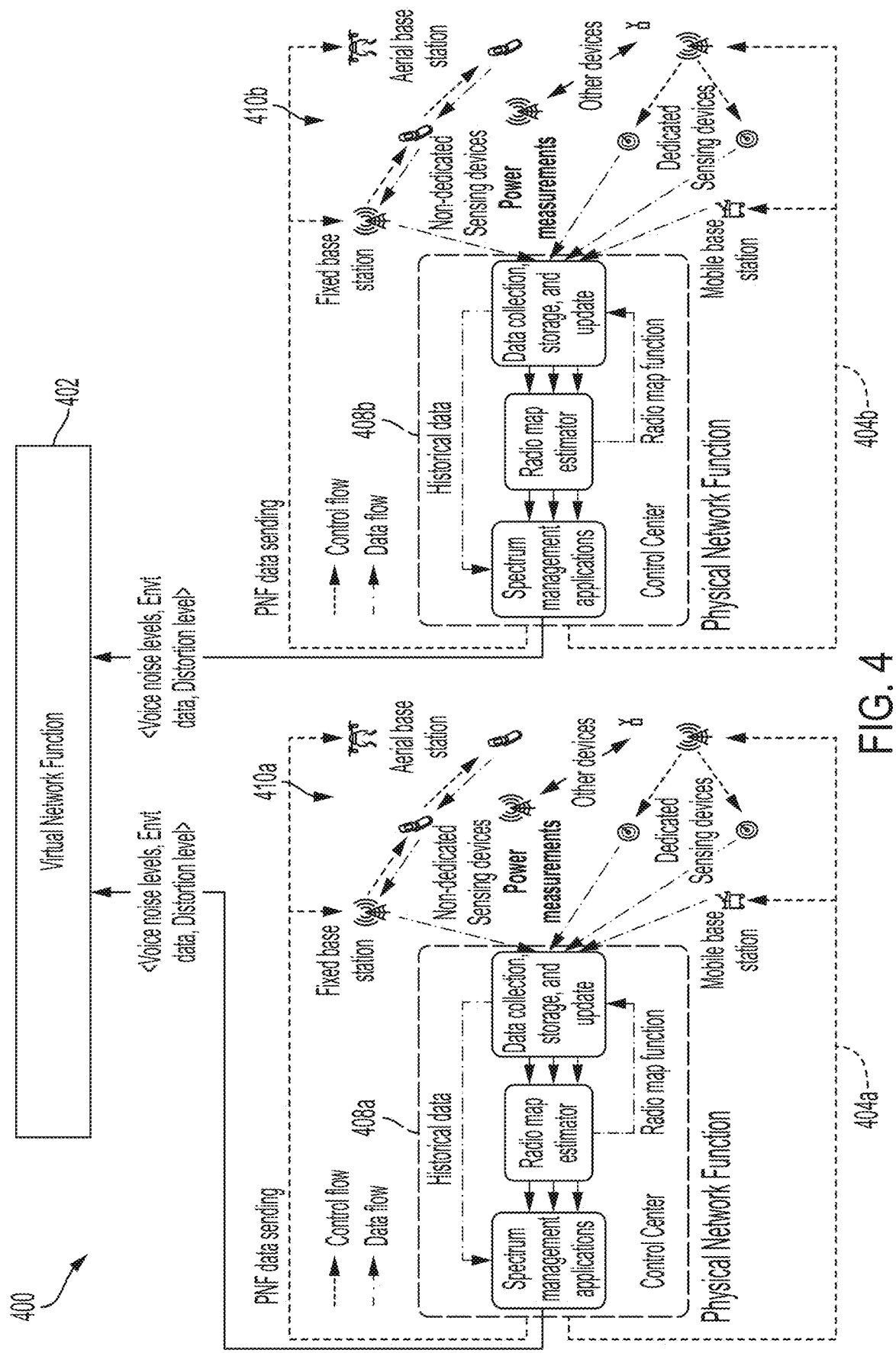
FIG. 4 illustrates a communication system enabling communications between a VNF and PNFs enabled via the system of FIG. 1, in accordance with embodiments of the present invention.

FIG. 4 illustrates a communication system 400 enabling communications between a VNF 402 and PNFs 404a and 404b (associated with peripherical information 408a and 408b and communications 410a and 410b) enabled via system 100 of FIG. 1, in accordance with embodiments of the present invention. Communication system 400 enables a process running within VNF 402 for collecting peripherical information 408a and 408b such as, inter alia, environmental noise related details and noise related details at a UE terminal for mapping with a pre-defined filter selection model. Peripherical information 408a and 408b may be associated with various levels of data at VNF 402. Peripherical information 408a and 408b may be enabled via usage of VNF-PNF integrator services thereby allowing a model to be selected from available pool of resources. Likewise, selected filtering agents (at VNF 402) are pushed to selected target endpoints (e.g., associated with PNF 404a and 404b) and associated activation interactions are transmitted to an end device (e.g., UE 133 of FIG. 1) to activate a filter for noise and distortion reduction.

Figure 5:
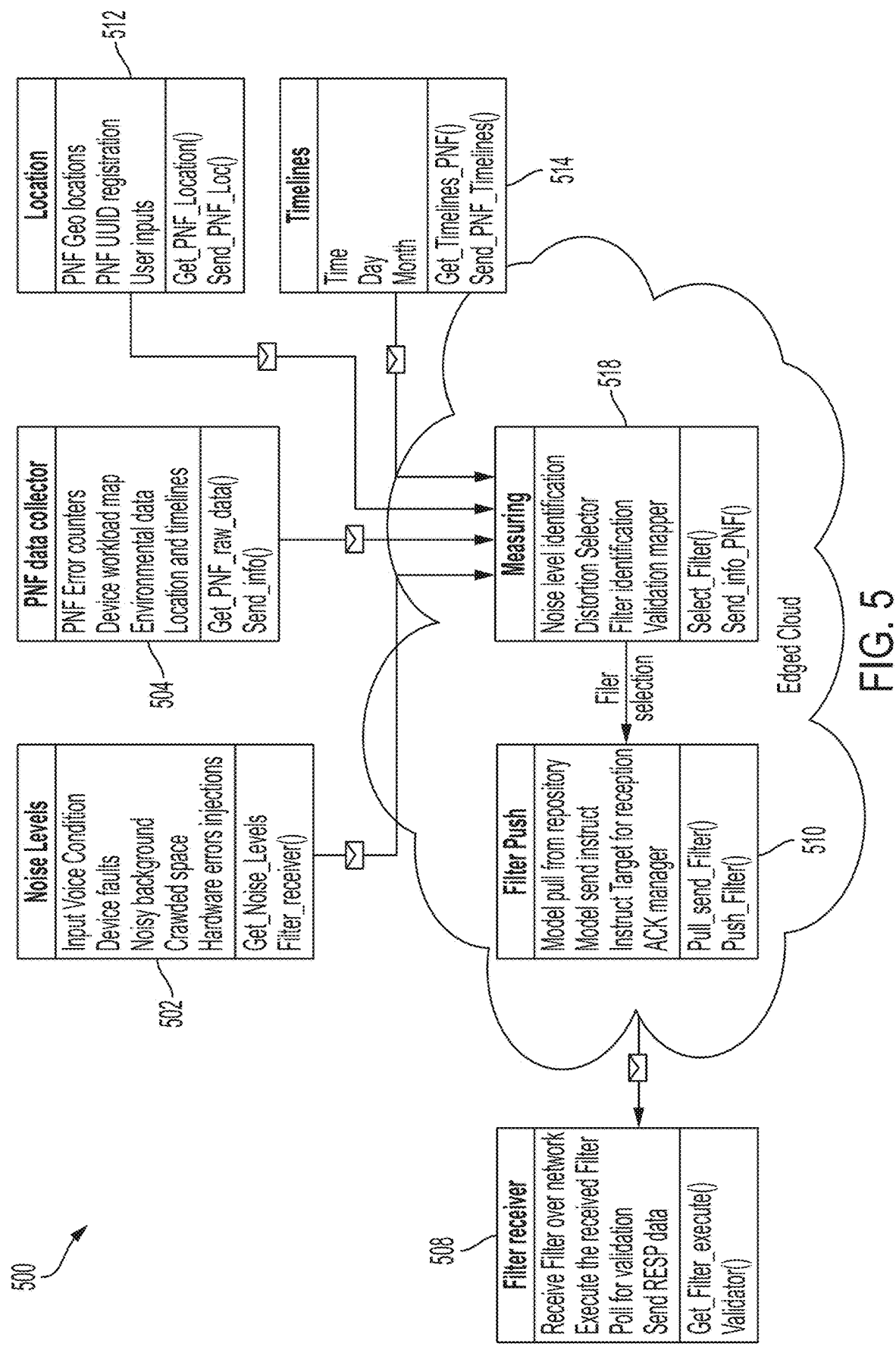
FIG. 5 illustrates an algorithm detailing a process flow for retrieving environmental characteristics and creating a noise profile, in accordance with embodiments of the present invention.

FIG. 5 illustrates an algorithm 500 detailing a process flow for retrieving environmental characteristics and creating a noise profile, in accordance with embodiments of the present invention. In steps 502 and 504, environmental characteristics from GPS based data resources respective PNF functions are retrieved. For example, stream based data collectors may be enabled to retrieve a GPS identity of a PNF boundary region. Likewise, an associated noise and distortion cancellation filter from a 5G core network infrastructure is enabled via execution of in band MAC based protocols. In step 508, a filtering agent selection process is performed at a VNF function and a service orchestration layer of 5G thereby propagating filtering agents to be pushed (in step 510) to the PNF and a logical endpoint based on a nature of a noise/distortion event. Likewise (in step 510), filter is pushed to UE devices experiencing noise over voice calls due to a noisy background. In steps 512 and 514, a location is tagged (with respect to a timeline) to create a noise profile. In response, noise-based filters are dynamically provisioned when a UE location is detected (in step 518) within a defined boundary region. For example, if a crowded retail facility is detected as a location, then a noise cancellation filter is provisioned during initiation of a voice call. Likewise, a noise cancellation filter may be provisioned with respect to natural noise initiating events. For example (with respect to detected heavy rain or CO2 values in the air) Co2 based distortion filtering agents are required at an eNodeB to obtain correct packet data decoding.

Figure 6A:
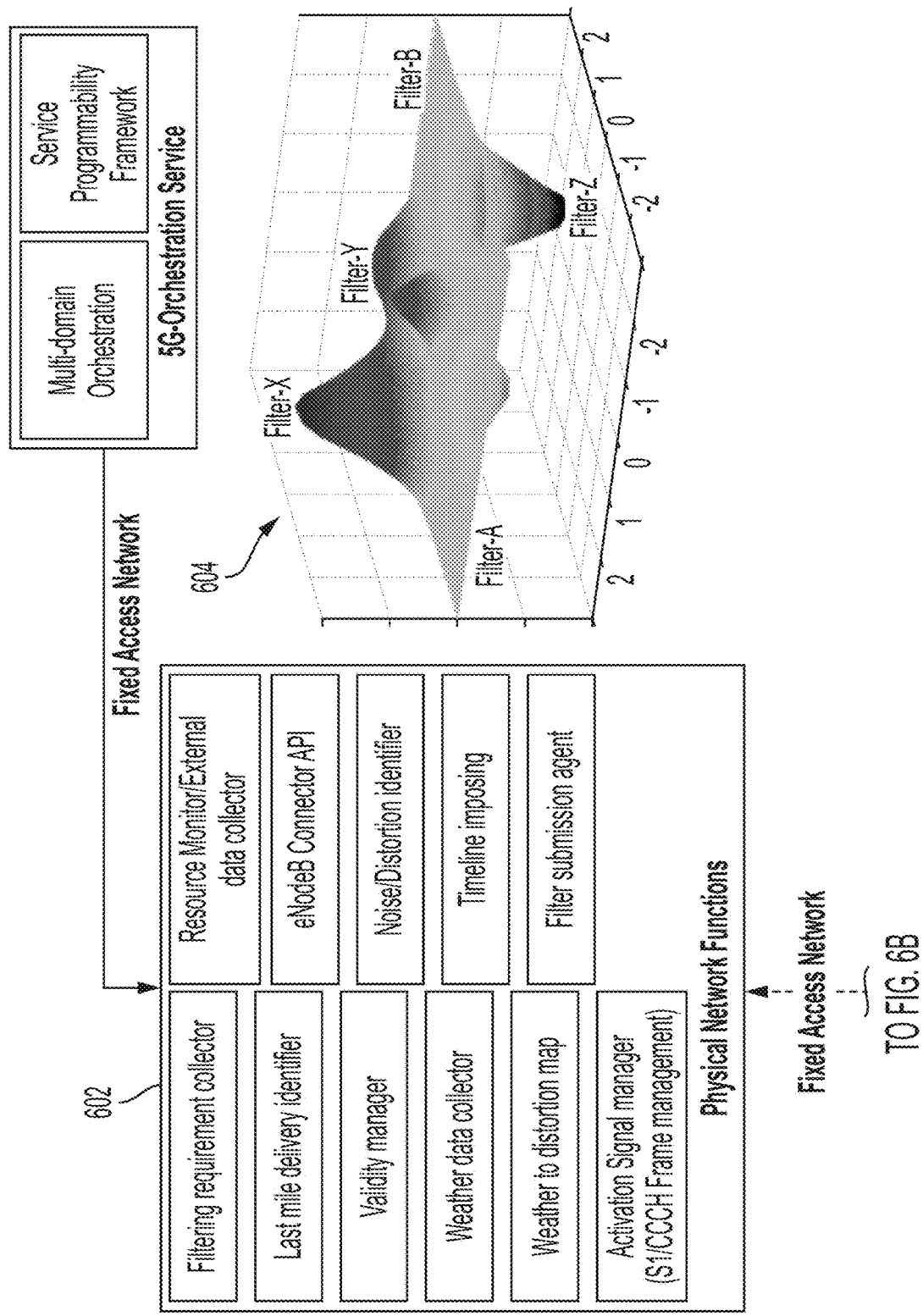
FIGS. 6A and 6B illustrate a system comprising requirements assessed with a predefined polling frequency via a service running within a radio access network (i.e., a VNF), in accordance with embodiments of the present invention.
Figure 6B:
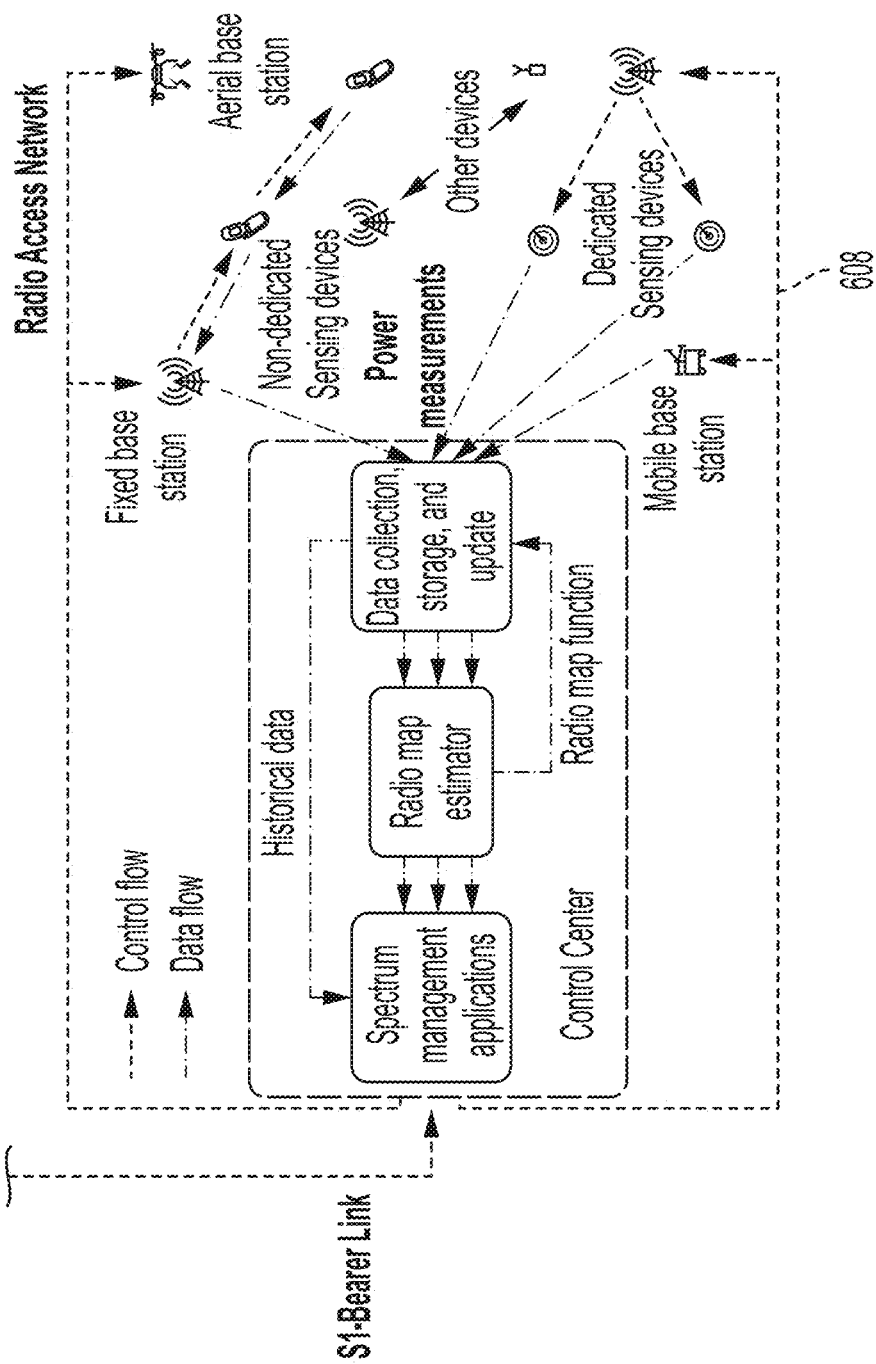

FIGS. 6A and 6B (in combination) illustrate a system 600 comprising requirements 602 assessed with a predefined polling frequency 604 via a service running within a radio access network 608 (i.e., a VNF), in accordance with embodiments of the present invention. System 600 is configured to provision a respective filtering agent to a degraded device to optimize network utilization and avoid packed retransmission errors. Interfaces are utilized to transmit various types of network traffic such that filtering agent selection is performed at radio access network 608. Likewise, filters are selected using a VNF multidimensional machine learning model with respect to multilevel features and attributes within a common filter repository. Additionally, input data attributes (i.e., associated with weather, location, and additional device specific characteristics) are applied to associated datasets. Subsequently, selected filtering agents are pushed to an edged device as follows:

1. Suitable filters are detected at radio access network 608 based on a requirement of a noise/distortion situation.
2. Logical channels are created to transfer the machine learning model at an edged location
3. An edged location is identified based on a type of filer. For example, a distortion filter comprises an edged loc=eNodeB.

Additionally, network commands are generated to issue an execution of a selected filter at a target location such that CCCH frames are formed over a radio interface and transmitted over an NR. Subsequently, a target device is configured to listen to an NR interface and receive an incoming filter in a temporary space of a device operating system. The incoming filter is executed and a selected filtering agent is activated for a specified timeline thereby saving a computation requirement at the target location and saving processing power at a terminal device. All further packet data transmission processes are performed after filter processing. A polling thread for a validation manager is activated at a PNF and is configured to poll for event validity. Likewise, an event manager triggers a signal when a current requirement is completed. Subsequently, the incoming filter is dissolved (i.e., deleted).

Figure 7:
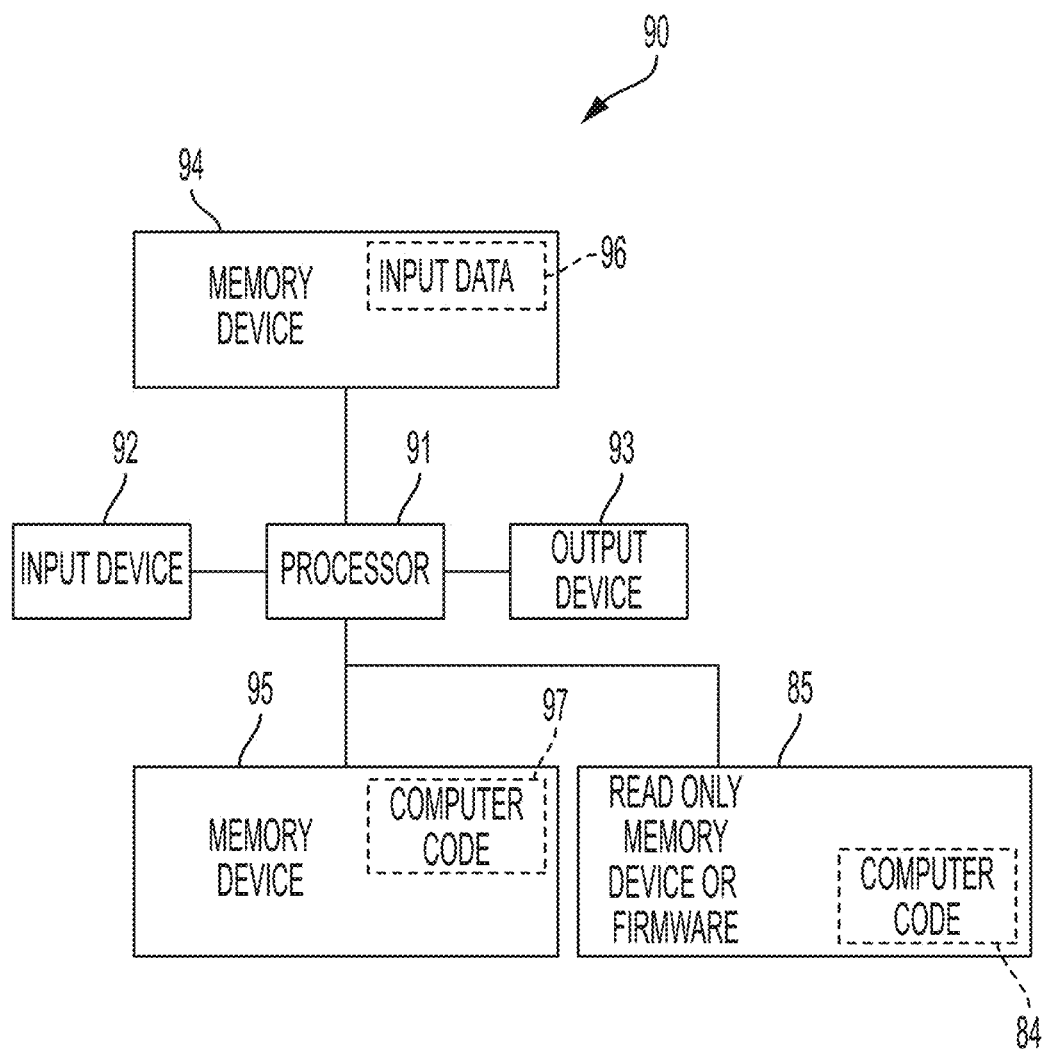
FIG. 7 illustrates a computer system used by the system of FIG. 1 for implementing an automated process for improving telecom network technology associated with selecting a filtering agent model and filtering agents, tagging a location of user equipment, activating the filtering agents, and reducing noise and distortion occurring during operation of the user equipment with respect to a telecom network, in accordance with embodiments of the present invention.

FIG. 7 illustrates a computer system 90 (e.g., telecom network hardware device 139 and UE 133 of FIG. 1) used by or comprised by the system 100 of FIG. 1 for improving telecom network technology associated with selecting a filtering agent model and filtering agents, tagging a location of user equipment, activating the filtering agents, and reducing noise and distortion occurring during operation of the user equipment with respect to a telecom network, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 2) for improving telecom network technology associated with selecting a filtering agent model and filtering agents, tagging a location of user equipment, activating the filtering agents, and reducing noise and distortion occurring during operation of the user equipment with respect to a telecom network. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve telecom network technology associated with selecting a filtering agent model and filtering agents, tagging a location of user equipment, activating the filtering agents, and reducing noise and distortion occurring during operation of the user equipment with respect to a telecom network. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving telecom network technology associated with selecting a filtering agent model and filtering agents, tagging a location of user equipment, activating the filtering agents, and reducing noise and distortion occurring during operation of the user equipment with respect to a telecom network. In another embodiment, the invention provides a business method that performs the process steps of the invention on a subscription, advertising, and/or fee basis. That is, a service supplier, such as a Solution Integrator, could offer to enable a process for improving telecom network technology associated with selecting a filtering agent model and filtering agents, tagging a location of user equipment, activating the filtering agents, and reducing noise and distortion occurring during operation of the user equipment with respect to a telecom network. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
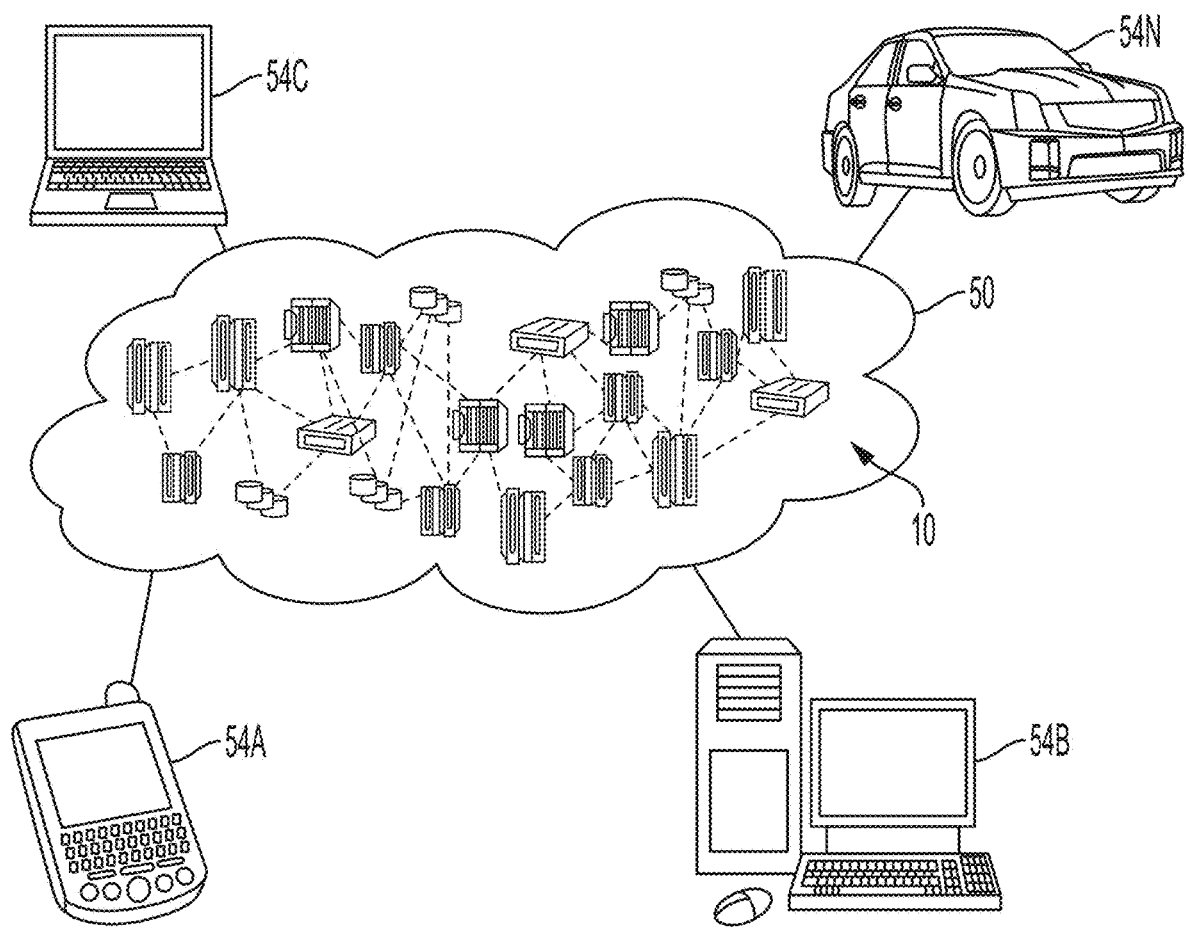
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 9:
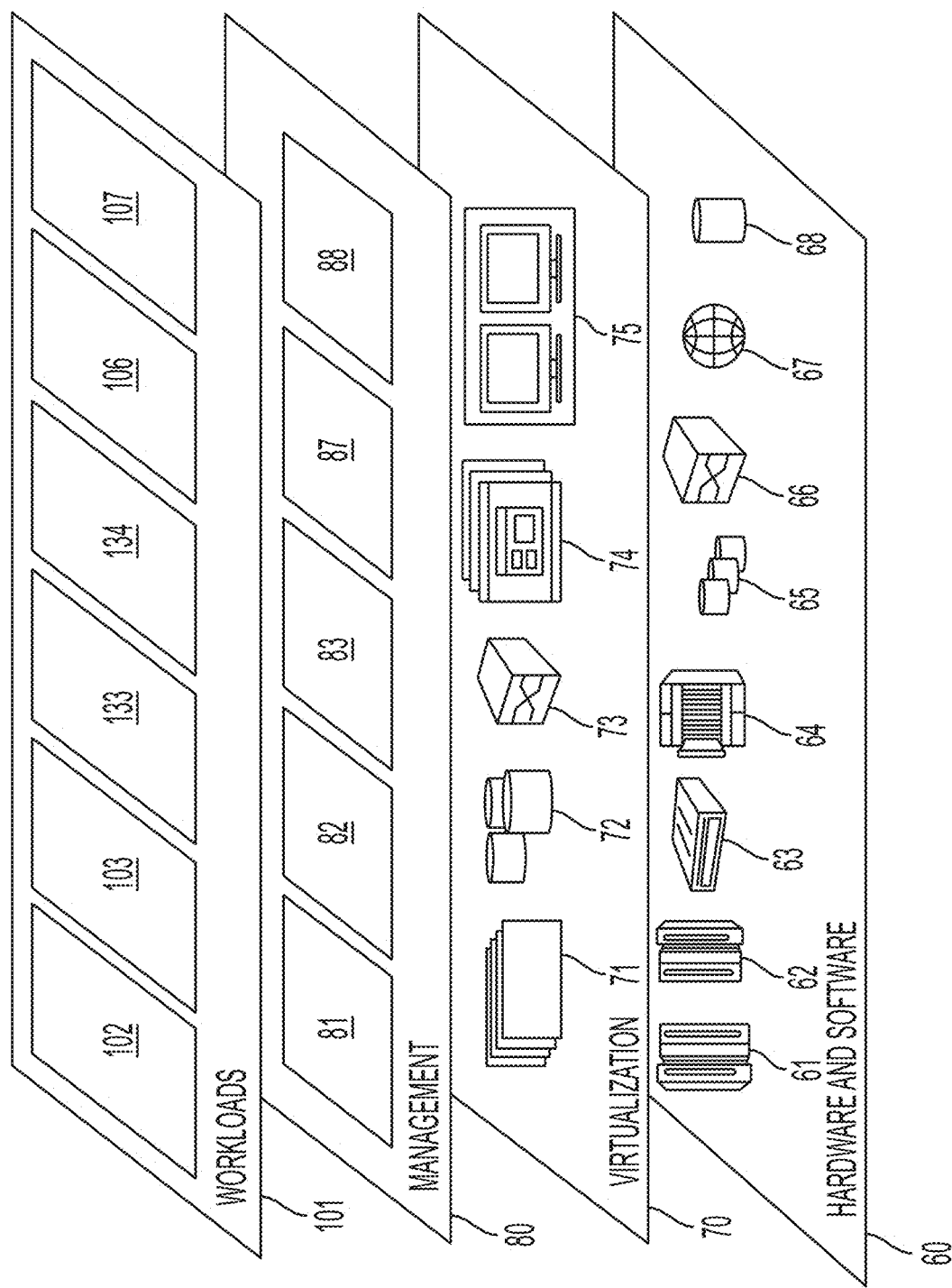
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network switching technology associated with detecting operational states for ports, generating actions associated with the operational states with respect to data packets arriving at the ports, and improving telecom network technology associated with selecting a filtering agent model and filtering agents, tagging a location of user equipment, activating the filtering agents, and reducing noise and distortion occurring during operation of the user equipment with respect to a telecom network 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A telecom network hardware device comprising a processor coupled to a computer-readable memory unit, the memory unit comprising instructions that when executed by the processor implements a dynamic telecom network agent filtering method comprising:

retrieving, by said processor executing software code with respect to a virtual network function (VNF) and a physical network function (PNF) of said telecom network hardware device, peripheral data associated with user equipment (UE) enabled with respect to a telecom network associated with said telecom network hardware device;

mapping, by said processor, said peripheral data with a pre-defined filter selection model;

selecting from a pool of model resources, by said processor executing said pre-defined filter selection model and in response to results of said mapping, a filtering agent model;

selecting, by said processor in response to executing said filtering agent model, filtering agents from said VNF and associated with noise and distortion reduction associated with said UE with respect to said telecom network;

retrieving, by said processor via a plurality of global positioning system (GPS) sensors, environmental characteristics associated with said telecom network;

tagging, by said processor based on said environmental characteristics, a specified location of said UE enabled with respect to said telecom network;

pushing, by said processor, said filtering agents to said UE, wherein said filtering agents are stored within a temporary memory space of an operating system of said UE;

generating, by said processor, network commands associated with execution of said filtering agents;

executing, by said processor in response to enabling said network commands, said filtering agents with respect to said UE, wherein said executing activates said filtering agents with respect to said UE for a specified timeframe; and reducing, by said processor in response to results of said executing, noise and distortion occurring during operation of said UE with respect to said telecom network.

2. The telecom network hardware device of claim 1, wherein said method further comprises:
after completing said reducing, removing by said processor, said filtering agents from said user equipment.

3. The telecom network hardware device of claim 1, wherein said pushing said filtering agents to said UE comprises:
transmitting activation interaction code to said UE; and
activating, in response to execution of said activation interaction code, said filtering agents for executing said reducing said noise and distortion.

4. The telecom network hardware device of claim 1, wherein said environmental characteristics are associated with resources related to triggered PNF functions.

5. The telecom network hardware device of claim 1, wherein said selecting said filtering agent model is executed with respect to a VNF and service orchestration layer of a 5G network.

6. The telecom network hardware device of claim 1, wherein said method further comprises:
assessing, by said processor, requirements of said filtering agents with respect to a predefined polling frequency associated with a service running within said VNF; and
provisioning, by said processor, a respective filtering agent of said filtering agents to a malfunctioning device of said UE for executing of said reducing.

7. The telecom network hardware device of claim 1, wherein said selecting said filtering agents comprises:
executing a VNF multidimensional machine learning model based on multilevel features and attributes of devices.

8. A dynamic telecom network agent filtering method comprising:
retrieving, by a processor of a telecom network hardware device executing software code with respect to a virtual network function (VNF) and a physical network function (PNF) of said telecom network hardware device, peripheral data associated with user equipment (UE) enabled with respect to a telecom network associated with said telecom network hardware device;

mapping, by said processor, said peripheral data with a pre-defined filter selection model;

selecting from a pool of model resources, by said processor executing said pre-defined filter selection model and in response to results of said mapping, a filtering agent model;

selecting, by said processor in response to executing said filtering agent model, filtering agents from said VNF and associated with noise and distortion reduction associated with said UE with respect to said telecom network;

retrieving, by said processor via a plurality of global positioning system (GPS) sensors, environmental characteristics associated with said telecom network;

tagging, by said processor based on said environmental characteristics, a specified location of said UE enabled with respect to said telecom network;

pushing, by said processor, said filtering agents to said UE, wherein said filtering agents are stored within a temporary memory space of an operating system of said UE;

generating, by said processor, network commands associated with execution of said filtering agents;

executing, by said processor in response to enabling said network commands, said filtering agents with respect to said UE, wherein said executing activates said filtering agents with respect to said UE for a specified timeframe; and reducing, by said processor in response to results of said executing, noise and distortion occurring during operation of said UE with respect to said telecom network.

9. The method of claim 8, further comprising:
after completing said reducing, removing by said processor, said filtering agents from said user equipment.

10. The method of claim 8, wherein said pushing said filtering agents to said UE comprises:
transmitting activation interaction code to said UE; and
activating, in response to execution of said activation interaction code, said filtering agents for executing said reducing said noise and distortion.

11. The method of claim 8, wherein said environmental characteristics are associated with resources related to triggered PNF functions.

12. The method of claim 8, wherein said selecting said filtering agent model is executed with respect to a VNF and service orchestration layer of a 5G network.

13. The method of claim 8, further comprising:
assessing, by said processor, requirements of said filtering agents with respect to a predefined polling frequency associated with a service running within said VNF; and
provisioning, by said processor, a respective filtering agent of said filtering agents to a malfunctioning device of said UE for executing of said reducing.

14. The method of claim 8, wherein said selecting said filtering agents comprises:
executing a VNF multidimensional machine learning model based on multilevel features and attributes of devices.

15. The method of claim 8, further comprising:
providing at least one support service for at least one of creating, integrating, hosting, maintaining, and deploying computer-readable code in the telecom network hardware device, said code being executed by the processor to implement: said retrieving said peripheral data, said mapping, said selecting said filtering agent model, said selecting said filtering agents, said retrieving said environmental characteristics, said tagging, said pushing, said generating, said executing, and said reducing.

16. A computer program product, comprising a computer readable hardware storage device storing a computer readable program code, said computer readable program code comprising an algorithm that when executed by a processor of a telecom network hardware device implements a dynamic telecom network agent filtering method, said method comprising:

retrieving, by said processor executing software code with respect to a virtual network function (VNF) and a physical network function (PNF) of said telecom network hardware device, peripheral data associated with user equipment (UE) enabled with respect to a telecom network associated with said telecom network hardware device;

mapping, by said processor, said peripheral data with a pre-defined filter selection model;

selecting from a pool of model resources, by said processor executing said pre-defined filter selection model and in response to results of said mapping, a filtering agent model;

selecting, by said processor in response to executing said filtering agent model, filtering agents from said VNF and associated with noise and distortion reduction associated with said UE with respect to said telecom network;

retrieving, by said processor via a plurality of global positioning system (GPS) sensors, environmental characteristics associated with said telecom network;

tagging, by said processor based on said environmental characteristics, a specified location of said UE enabled with respect to said telecom network;

pushing, by said processor, said filtering agents to said UE, wherein said filtering agents are stored within a temporary memory space of an operating system of said UE;

generating, by said processor, network commands associated with execution of said filtering agents;

executing, by said processor in response to enabling said network commands, said filtering agents with respect to said UE, wherein said executing activates said filtering agents with respect to said UE for a specified timeframe; and reducing, by said processor in response to results of said executing, noise and distortion occurring during operation of said UE with respect to said telecom network.

17. The telecom network hardware device of claim 16, wherein said method further comprises:

after completing said reducing, removing by said processor, said filtering agents from said user equipment.

18. The telecom network hardware device of claim 16, wherein said pushing said filtering agents to said UE comprises:

transmitting activation interaction code to said UE; and activating, in response to execution of said activation interaction code, said filtering agents for executing said reducing said noise and distortion.

19. The telecom network hardware device of claim 16, wherein said environmental characteristics are associated with resources related to triggered PNF functions.

20. The telecom network hardware device of claim 16, wherein said selecting said filtering agent model is executed with respect to a VNF and service orchestration layer of a 5G network.

* * * * *